United States Patent [19]
Scott

[11] 4,252,586
[45] Feb. 24, 1981

[54] METHOD AND APPARATUS FOR MANUFACTURE OF SLIDE FASTENER STRINGER WITH FOLDED AND BONDED CONTINUOUS MOLDED COUPLING ELEMENTS

[75] Inventor: George W. Scott, Conneaut Lake, Pa.

[73] Assignee: Textron, Inc., Providence, R.I.

[21] Appl. No.: 28,940

[22] Filed: Apr. 11, 1979

Related U.S. Application Data

[62] Division of Ser. No. 687,074, May 17, 1976, Pat. No. 4,210,985.

[51] Int. Cl.³ .................... B29C 27/02; B29D 5/00; B29F 1/00
[52] U.S. Cl. .................................. 156/73.1; 156/66; 156/200; 156/245; 156/500; 156/580.1; 264/271; 425/121; 425/123; 425/129 R; 425/545; 425/814
[58] Field of Search .............. 156/73.1, 73.2, 66, 156/245, 500, 580.1, 93, 200, 204; 24/205.13 D, 205.16 R; 264/271, 285; 425/814, 129 R, 220, 576, 545, 571, 123, 121

[56] References Cited
U.S. PATENT DOCUMENTS

| | | | |
|---|---|---|---|
| 2,368,316 | 1/1945 | Meitner | 156/66 |
| 3,175,028 | 3/1965 | Waldes et al. | 425/545 |
| 3,196,196 | 7/1965 | Burbank | 425/814 |
| 3,445,915 | 5/1969 | Cuckson et al. | 425/814 |
| 3,487,531 | 1/1970 | Cuckson et al. | 29/410 |
| 3,589,957 | 6/1971 | Cohn | 156/66 |
| 3,836,413 | 9/1974 | Frohlich et al. | 156/66 |
| 3,951,716 | 4/1976 | Takamatsu | 156/73.2 |
| 3,962,007 | 6/1976 | Heimberger | 156/245 |
| 4,033,014 | 7/1977 | Manning | 24/205.13 D |
| 4,101,360 | 7/1978 | Monroe | 156/200 |
| 4,115,489 | 9/1978 | MacFee | 156/73.2 |
| 4,158,532 | 6/1979 | Kowalski | 425/545 |
| 4,182,600 | 1/1980 | Moertel | 425/545 |

Primary Examiner—Michael G. Wityshyn
Attorney, Agent, or Firm—O'Brien & Marks

[57] ABSTRACT

The leg portions of a continuous molded coupling element are bonded together to reinforce the attachment of connecting threads embedded in the leg portions, and a longitudinal cord is laid in grooves formed in heels of the leg portions to improve the stability of the coupling elements.

7 Claims, 7 Drawing Figures

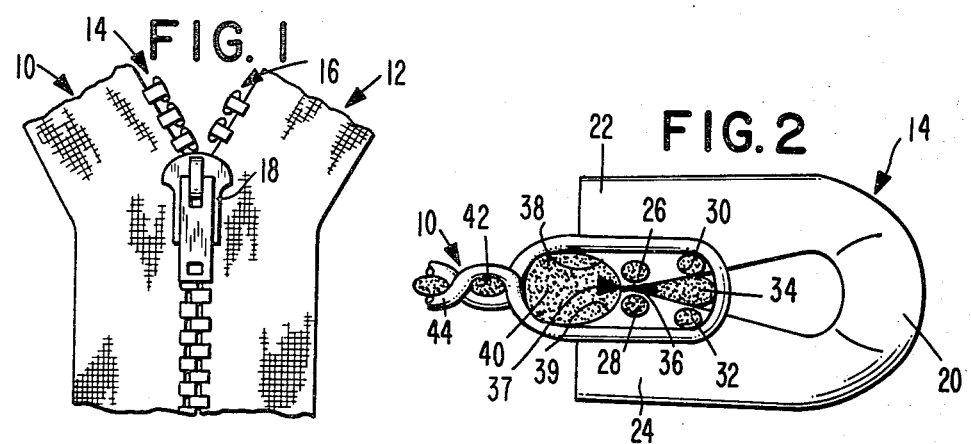
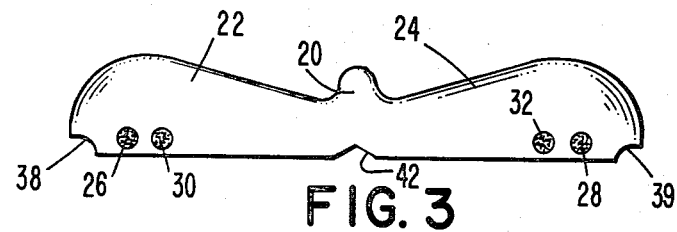
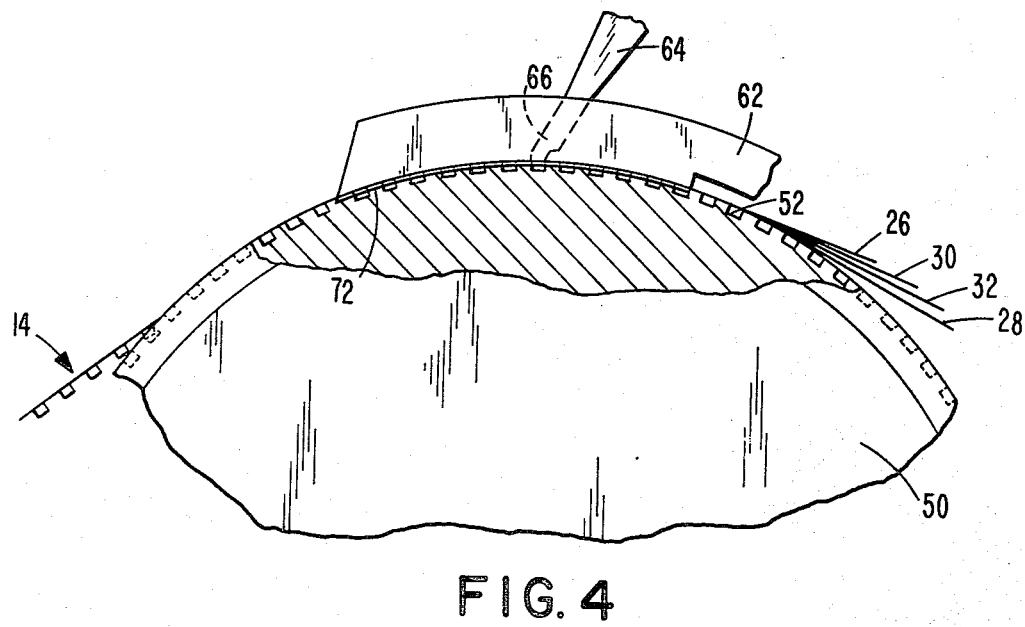

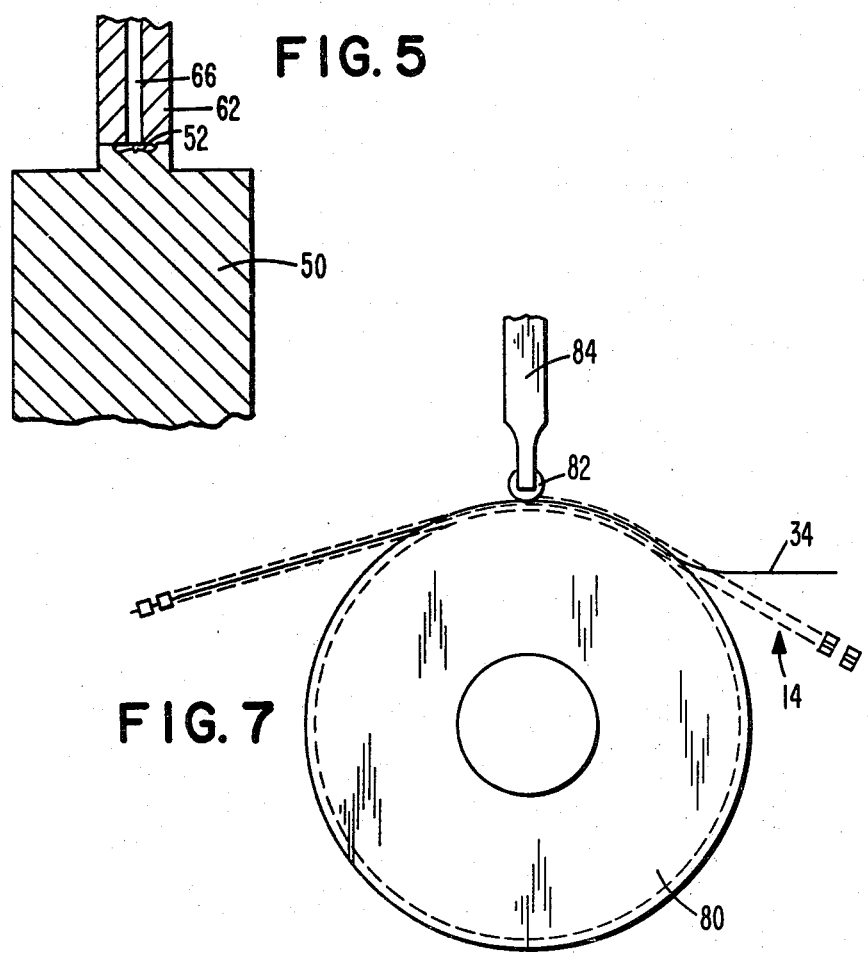
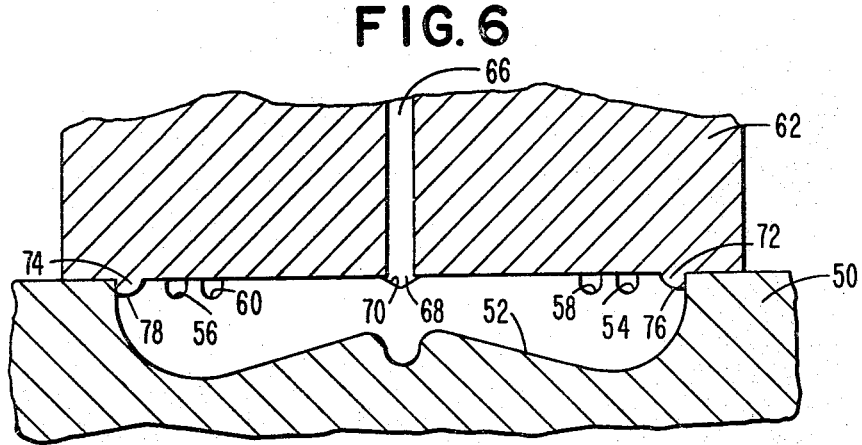

METHOD AND APPARATUS FOR MANUFACTURE OF SLIDE FASTENER STRINGER WITH FOLDED AND BONDED CONTINUOUS MOLDED COUPLING ELEMENTS

CROSS-REFERENCE TO RELATED APPLICATION

This is a divisional application from its parent application Ser. No. 687,074 filed May 17, 1976, now Pat. No. 4,210,985.

BACKGROUND OF THE INVENTION

1. Field of the Invention

The invention relates to slide fasteners and particularly to slide fasteners employing continuous molded coupling elements joined in a train by connecting threads as well as their methods and apparatus for manufacture.

2. Description of the Prior Art

The prior art, as exemplified in U.S. Pat. No. 3,328,857, No. 3,414,948, No. 3,445,915 and No. 3,487,531, contains a number of continuous molded coupling elements joined by embedded connecting threads and methods and apparatus for manufacture thereof. Generally, the connecting threads in such prior art coupling elements are unsuitable for use as the means of attachment to a carrier tape since the connecting threads are embedded relatively shallowly in the legs of the coupling elements and are easily pulled from coupling elements by cross-wise forces on the slide fastener; thus the leg portions of the prior art coupling elements are generally sewn to the edge of the tape. Such sewing of the leg portions to the tapes results in increased cost and extra steps in the manufacture of the coupling elements.

SUMMARY OF THE INVENTION

The invention is summarized in a method of forming a stringer for a slide fastener wherein leg portions of coupling elements are folded together and bonded adjacent their heels. Grooves are formed in the heels and a support cord is laid in the grooves. This support cord together with connecting threads, embedded in the leg portions during injection molding in a row of cavities in a cavity wheel, are secured to a edge of the carrier tape.

An object of the invention is to construct a slide fastener stringer having a continuous molded coupling element joined by connecting threads and woven together in the edge of a tape by using present weaving techniques.

Another object of the invention is to reinforce embedded connecting threads joining continuous molded coupling elements in order to withstand cross-wise forces on a slide fastener.

It is also an object of the invention to weld the heels of the leg portions of the coupling elements together to reinforce connecting threads joining the coupling elements as well as to seal in an invested cord between the leg portions.

One feature of the invention is the formation of a groove in the joined heels of leg portions of coupling elements to receive a longitudinal cord and improve the stability of the coupling elements relative to the tape.

Another feature of the invention is that one-half of a cord receiving groove is formed in the heel of each leg portion during the molding of the slide fastener.

In still another aspect, the bending of leg portions of continuous molded coupling elements is improved by forming notches on the inside of head portions of the coupling element.

Other objects, advantages, and features of the invention will be apparent from the following description of the preferred embodiment taken in conjunction with the accompanying drawings.

BRIEF DESCRIPTION OF THE DRAWINGS

FIG. 1 is a plan view of a slide fastener made in accordance with the invention.

FIG. 2 is a cross section view of a portion of one stringer of the slide fastener of FIG. 1.

FIG. 3 is a side view of a molded coupling element during an intermediate step of forming a coupling element for the stringer of FIG. 1.

FIG. 4 is a front view of a portion of an apparatus for continuously molding a train of the coupling elements of FIG. 3.

FIG. 5 is a side cross section view of the molding apparatus of FIG. 4.

FIG. 6 is an enlarged view of a portion of the cross section view of FIG. 5.

FIG. 7 is a front view of an apparatus for bonding leg portions of the coupling elements of FIG. 2 together.

DESCRIPTION OF THE PREFERRED EMBODIMENT

A slide fastener, shown in FIG. 1 and manufactured in accordance with the invention, includes a pair of carrier tapes indicated generally at 10 and 12 and a pair of trains of coupling elements indicated generally at 14 and 16 secured to the inner edges of the respective tapes 10 and 12. A slider 18 is slidably mounted on the coupling elements 14 and 16 for opening and closing the slide fastener. The tape 10 and coupling elements 14 form a left stringer while the tape 12 and the coupling elements 16 form a right stringer; the left and right stringers together forming a chain for the slide fastener. The right stringer is substantially identical to the left stringer except that it is a mirror image thereof.

Each of the coupling elements 14 as illustrated in FIG. 2 has a head portion 20 with a pair of leg portions 22 and 24 extending in the same direction from opposite sides of the head portion 20. Four connecting threads 26, 28, 30 and 32 are embedded in the leg portions 22 and 24 near converging inside surfaces thereof; one pair of the connecting threads 26 and 28 being embedded in the respective leg portions 22 and 24 adjacent to the heels thereof while the other pair 30 and 32 are embedded in the respective leg portions 22 and 24 at a location spaced toward the head portion 20 from the pair of threads 26 and 28. An invested cord 34 is positioned between the leg portions 22 and 24 which are bonded or sealed together, such as by a weld 36, formed adjacent to the heels of the leg portions 22 and 24. Well or groove halves 38 and 39, together forming a single groove indicated generally at 37, are formed in the heels of the prospective leg portions 22 and 24 to accommodate a support cord 40. The tape 10 has a plurality of warp threads 42 with an interwoven weft thread 44 which encircles the support cord 40 together with the connecting threads 26, 28, 30 and 32 and the invested cord 34 between the coupling elements 24 to secure the train of coupling elements 14 to the inner edge of the tape 10.

The bond 36 formed between the leg portions 22 and 24 adjacent the heel thereof substantially increases the strength of the attachment of the coupling elements 14 to the tape 10. The connecting threads 26, 28, 30 and 32, being only shallowly embedded in the coupling elements 14 on the inside of the leg portions 22 and 24, have a tendency to be pulled from the coupling elements 14 in absence of the bond 36; but the bond 36 joins inside surfaces of the leg portions 22 and 24 together to form a unitary heel portion with the connecting threads, particularly threads 26 and 28, centrally embedded therein, to greatly reinforce the union of the connecting threads 26, 28, 30 and 32 with the leg portions 22 and 24. Also, the bond 36 seals in the invested cord 34 capturing it between the leg portions 22 and 24. By so capturing the invested cord 34, it reinforces the union of the connecting threads, particularly the threads 30 and 32, due to compression between the leg portions 22 and 24 adjacent the threads 30 and 32; the invested cord 34 also provides an additional member of relatively greater strength to help withstand crosswise slide fastener forces transmitted through picks of the weft thread 44. Being located between the connecting threads 30 and 32 as well as absorbing a substantial share of the tension forces of the weft thread picks, the invested cord 34 maintains spacing between the threads 30 and 32 and decreases distortion of the spacing between coupling elements due to pulling of the weft thread picks on the threads 30 and 32.

The groove 37 with the support cord 40 being laid therein greatly improves the stability of the coupling elements 14 and their attachment to the tape 10. In addition to greatly increasing the longtudinal strength and stability of the inner edge of the tape 10, the cord 40 in the groove 37 prevents the elements 14 from moving sideways relative to the tape 10. The support cord 40 together with the invested cord 34 and the connecting threads 26, 28, 30 and 32 form a substantial package integrally joined with the leg portions 22 and 24 of the coupling elements 14 for attachment by the encirclement of the weft thread 44 on the inner edge of the tape 10.

An apparatus, shown in FIGS. 4, 5 and 6, for continuously molding the coupling elements 14 in an elongated, flat and unfolded condition, as shown in FIG. 3, includes a rotatable cavity wheel 50 having a plurality of spaced elongated cavities 52 formed in a row around the periphery thereof. The cavities 52 extend parallel to the axis of the wheel 50. A plurality of annular grooves 54, 56, 58 and 60 are formed in the periphery of the wheel 50 for receiving the respective connecting threads 26, 28, 30 and 32 to intersect end or leg forming portions of the cavities 52. Slidingly engaging the periphery of the wheel 50, a stationary injection shoe 62 has a passageway 66 communicating between a molten thermoplastic injection means and the cavities 52 as the cavity wheel 54 is rotated. Also, the shoe 62 has a V-shaped projecting rib 68 mating with a V-shaped annular groove 70 formed in the periphery of the wheel 50 and intersecting head forming portions of the cavities 52 for forming notches 42, FIG. 3, in the coupling elements 14. Sides of the rib 68 extend into the leg forming portions of the cavities 52 adjacent to the head forming portion. Projecting ribs 72 and 74 on the shoe 62 mate with annular grooves or channels 76 and 78 formed in the periphery of the wheel 50 and intersecting the outer edges or heels of the leg forming portions of the cavities 52 for forming the groove halves 38 and 39 in the heels of the leg portions 22 and 24 of the coupling elements 14.

An apparatus for welding the leg portions 22 and 24 of the coupling elements 14 together after insertion of the invested cord 34 is illustrated in FIG. 7. A rotatable wheel 80 is notched with a spacing coniciding with the proper spacing of elements 14 to receive the coupling elements 14 bent into a U-shape. Suitably disposed above the wheel 80 is a smaller wheel 82 rotatably mounted on the lower end of an ultrasonic vibration mechanism 84, for further bending and welding the leg portions 22 and 24 together.

In the method of manufacture of the left stringer for the slide fastener, the coupling elements are initially molded in the apparatus of FIGS. 4, 5 and 6 by injecting molten synthetic polymer resin through the passage 66 into the cavities 52 as the cavities 52 are moved beneath the shoe 62. The connecting threads 26, 28, 30 and 32 fed into the respecting grooves 54, 56, 58 and 60 of the cavity wheel 50 beneath the shoe 62 became embedded in the injected polymer resin. After hardening, the train of coupling elements 14, in the flat unfolded condition of FIG. 3 and joined in a train by the connecting threads 26, 28, 30 and 32, are stripped or removed from the cavity wheel 50. The groove halves 38 and 39 and the V-shaped groove 42 are formed by the respective ribs 72, 74 and 68 during the formation of the trains of unfolded coupling elements.

Subsequently, the coupling elements 14 are suitably folded into a U-shape with the leg portions 22 and 24 extending in the same direction, the cord 34 is inserted between the leg portions 22 and 24, and the train of coupling elements 14 with the invested cord 34 is fed to the periphery of the wheel 80, FIG. 7. Ultrasonic energy from the wheel 82 welds the leg portions 22 and 24 together at 36 as shown in FIG. 2; the welding also forming the grooves 37 from the halves 38 and 39. The train of coupling elements 14 with the sealed leg portions is fed to a conventional slide fastener weaving apparatus along with the cord 40 which is laid in the grooves 37. The weft thread 44 is woven with the warp threads 43 and is passed around the package of cords 34 and 40 and threads 26, 28, 30 and 32 between the coupling elements 14 to form a woven slide fastener stringer.

Folding of the leg portions 22 and 24 is aided by the V-shape grooves 42. The sides of the grooves 42 extending into the leg portions 22 and 24 narrows the junctions of the leg portions with the head portion 20 making such junctions more flexible and easier to bend.

Forming the grooves 37 by forming the two groove halves in the heels of the respective leg portions 22 and 24 as they are molded avoids extra steps in manufacturing the coupling elements. Additionally distortion, such as would be caused by plastically deforming the heels of the leg portions after they have been bonded together, is avoided; thus producing coupling elements with uniform dimensions.

Since many modifications, variations and changes in detail may be made to the described slide fastener and its method and apparatus for manufacture it is intended that all matter in the foregoing description and shown in the accompanying drawings be interpreted as illustrative and not in a limiting sense.

What is claimed is:

1. A method of forming a stringer for a slide fastener comprising feeding a plurality of spaced connecting threads into annular grooves extending around the periphery of a cavity wheel and intersecting transverse elongated coupling element cavities formed in a row around the cavity wheel periphery, injecting molten synthetic polymer resin sequentially into the cavities to embed the connecting threads in opposite leg portions in the cavities, hardening the injected syntehtic polymer resin to form an unfolded train of coupling elements, folding the leg portions of the coupling elements together about their junctions to the head portions, bonding the folded leg portions together adjacent their heels, forming grooves during said injecting in the heels of the leg portions longitudinally relative to the train of coupling elements, laying a support cord in the grooves of the heels after said bonding, and securing the support cord together with the connecting threads to an edge of a carrier tape.

2. A method of forming a stringer for a slide fastener as claimed in claim 1 including inserting a cord between the leg portions of the coupling elements prior to bonding the leg portions together.

3. A method of forming a stringer for a slide fastener as claimed in claim 2 wherein the leg portions are bonded together by ultrasonic welding.

4. A method of forming a stringer for a slide fastener as claimed in claim 1 wherein the grooves in the heels are formed during the injection molding by forming in each leg portion in each element a half portion of a groove such that when the leg portions are bonded together the half portions form the grooves.

5. A method of forming a stringer as claimed in claim 1 including forming transverse V-shaped notches in the inside surfaces of the head portions of the unfolded coupling elements such that the sides of the notches extend into the leg portions adjacent the head portions whereby subsequent folding of the leg portions is enhanced.

6. An apparatus for continuously molding a train of unfolded coupling elements for a slide fastener, the apparatus comprising a rotatable cavity wheel having (a) a plurality of elongated coupling element cavities formed in a row about the periphery of the cavity wheel, said cavities having a head forming portion and a pair of leg forming portions extending from opposite sides of the head forming portion; (b) a plurality of annular connecting thread receiving grooves extending around the periphery of the cavity wheel intersecting the respective leg forming portions of the cavities; and (c) a pair of rib receiving annular grooves extending around the periphery of the cavity wheel and intersecting the heels of leg forming portions of the cavities; and a synthetic polymer resin injection means including a stationary shoe slidably engaging the periphery of the cavity wheel, said shoe having a pair of arcuate ribs extending into the respective rib receiving grooves of the cavity wheel for forming respective half portions of a support cord receiving groove in the heels of the coupling elements.

7. An apparatus as claimed in claim 6 wherein the cavity wheel includes a V-shaped annular groove extending around the cavity wheel periphery intersecting the head forming portions of the cavities, side portions of the V-shaped annular grooves extending to the leg forming portions of the cavities; and the shoe has a V-shaped arcuate rib extending into the V-shaped annular groove of the cavity wheel for forming notches in the coupling elements formed in the cavities.

* * * * *